No. 631,990. Patented Aug. 29, 1899.
H. H. HUFF.
LOCOMOTIVE ENGINE.
(Application filed Oct. 21, 1898.)
(No Model.) 3 Sheets—Sheet 1.
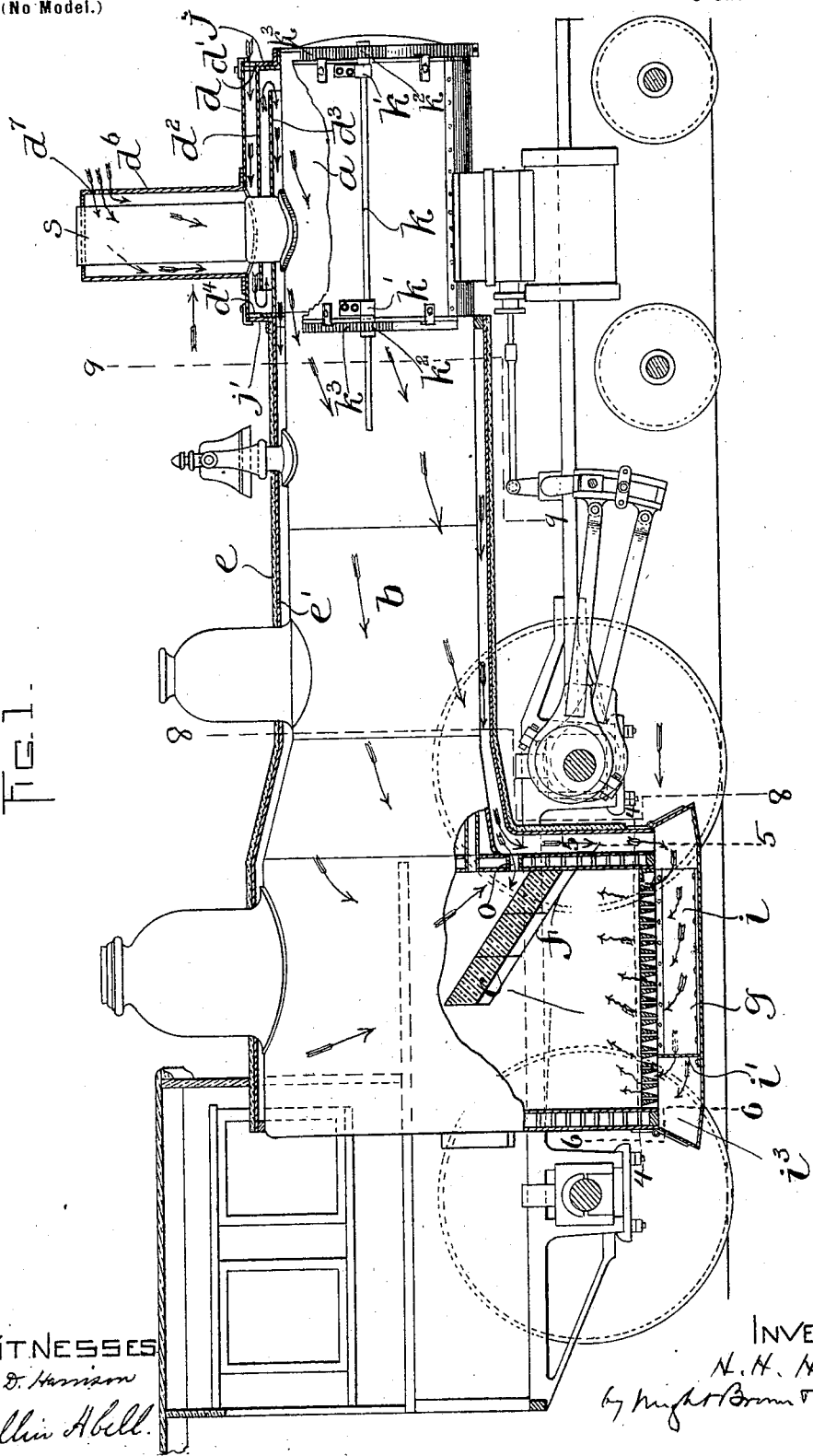
WITNESSES
A. D. Harrison
Rollin Abell
INVENTOR:
H. H. Huff.
by Wright Brown & Quinby
attys.

No. 631,990. Patented Aug. 29, 1899.
H. H. HUFF.
LOCOMOTIVE ENGINE.
(Application filed Oct. 21, 1898.)
(No Model.) 3 Sheets—Sheet 2.
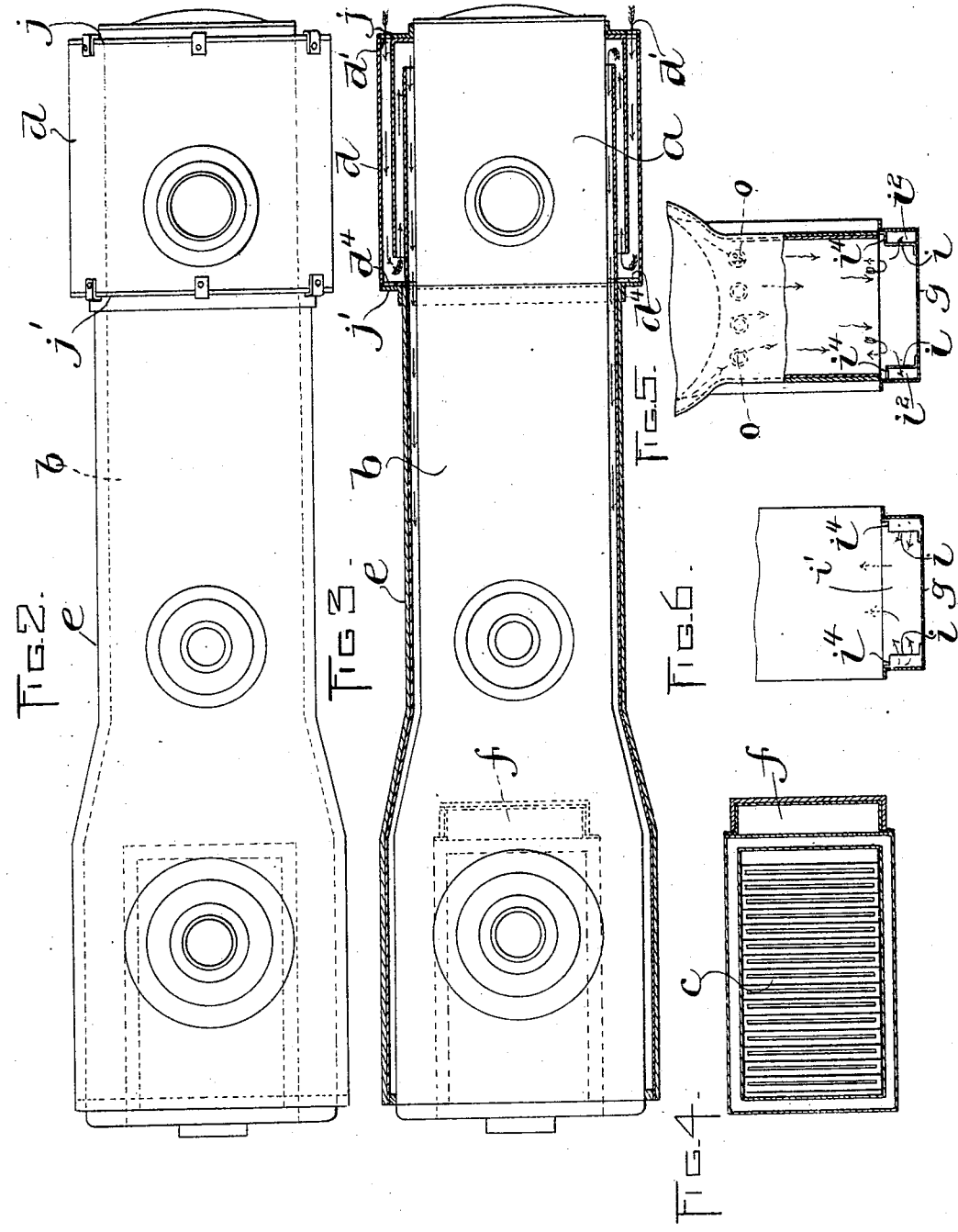
WITNESSES:
A. D. Hamann
Rollin Abell
INVENTOR
H. H. Huff No. 631,990. Patented Aug. 29, 1899.
H. H. HUFF.
LOCOMOTIVE ENGINE.
(Application filed Oct. 21, 1898.)
(No Model.) 3 Sheets—Sheet 3.
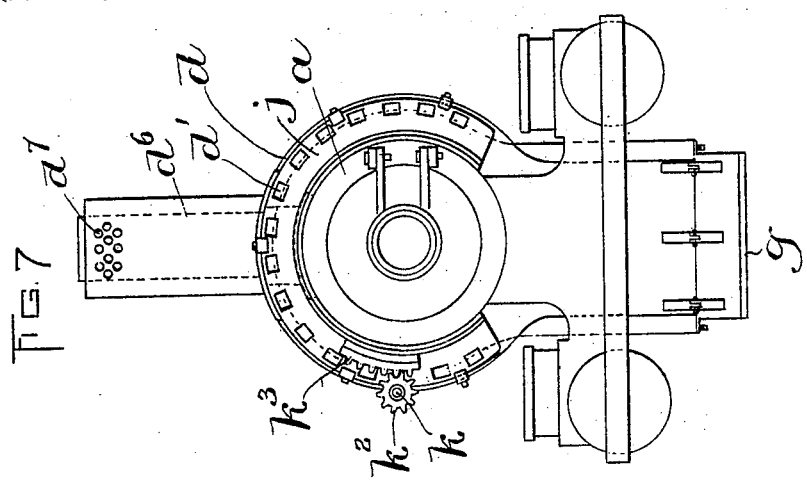
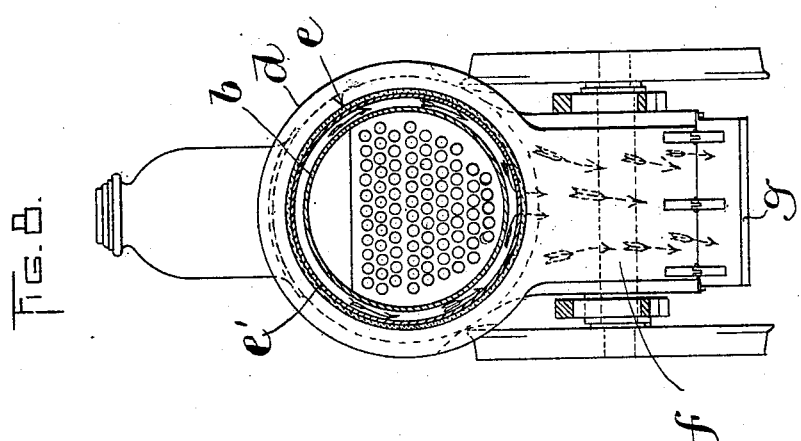
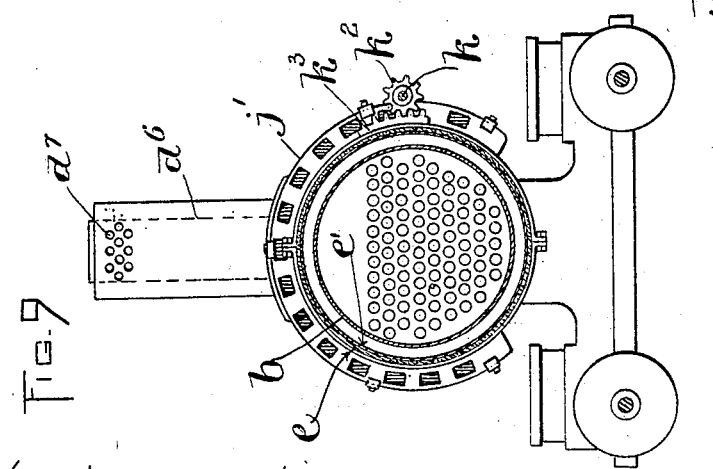
WITNESSES:
A. D. Harrison.
Rollin Abell.
INVENTOR
H. H. Huff
by Wright Brown & Quinby
attys.
THE NORRIS PETERS CO., PHOTO-LITHO., WASHINGTON, D. C.

UNITED STATES PATENT OFFICE.

HENRY H. HUFF, OF BOSTON, MASSACHUSETTS, ASSIGNOR OF ONE-HALF TO ARTHUR D. CURRAN, OF SAME PLACE, AND SMITH P. BURTON, JR., OF READING, MASSACHUSETTS.

LOCOMOTIVE-ENGINE.

SPECIFICATION forming part of Letters Patent No. 631,990, dated August 29, 1899.

Application filed October 21, 1898. Serial No. 694,199. (No model.)

*To all whom it may concern:*

Be it known that I, HENRY H. HUFF, of Boston, in the county of Suffolk and State of Massachusetts, have invented certain new and useful Improvements in Locomotive-Engines, of which the following is a specification.

This invention has for its object to utilize the heat that is radiated from the smoke-arch and from other exposed heated surfaces of a locomotive-engine in heating the air that is supplied to the fire-box to maintain combustion, so that the smoke may be more perfectly consumed.

The invention consists in the improvements which I will now proceed to describe and claim.

Of the accompanying drawings, forming a part of this specification, Figure 1 represents a sectional elevation showing my invention applied to a locomotive-engine. Fig. 2 represents a top plan view showing the smoke-arch, boiler, and fire-box. Fig. 3 is a view similar to Fig. 2, showing the portions constituting my improvement in section. Fig. 4 represents a section on line 4 4 of Fig. 1. Fig. 5 represents a section on line 5 5 of Fig. 1 looking toward the left. Fig. 6 represents a section on line 6 6 of Fig. 1 looking toward the right. Fig. 7 represents a front end elevation of the engine. Fig. 8 represents a section on line 8 8 of Fig. 1. Fig. 9 represents a section on line 9 9 of Fig. 1.

The same letters of reference indicate the same parts in all the figures.

In the drawings, $a$ represents the smoke-arch, $b$ the boiler, and $c$ the fire-box, of a locomotive-engine, the same being of any suitable form and construction. Surrounding the smoke-arch, either wholly or partially, is an air-chamber $d$, preferably of cylindrical form, having at its front end a series of orifices $d'$, that are open to the atmosphere and constitute a front air-inlet. The chamber $d$ is preferably internally subdivided to form a sinuous passage for air entering the said front inlet and is here shown as thus subdivided by means of an annular partition $d^2$, extending from the front end of the chamber partly to the rear end, and another annular partition $d^3$, extending from the rear end partly to the front end, said partitions causing the air to pass through the chamber in a sinuous course, indicated by the arrows in Fig. 1. The rear end of the chamber $d$ is also provided with a series of orifices $d^4$, which collectively constitute a rear air-inlet, said front and rear air-inlets being opened alternately, as hereinafter explained.

$e$ represents a sheath or jacket which wholly or partially surrounds the boiler $b$ and which preferably incloses the top and side surfaces of the fire-box, the said jacket being separated from the external surfaces of the boiler and fire-box by a narrow space which constitutes a conduit communicating at one end with the air-chamber $d$ and at the other end with a flue or passage $f$, which enters the forward end of the ash-pan $g$ under the fire-box. The sheath $e$ is preferably constructed to prevent the radiation of heat from it, and to this end it may have a lining $e'$ of asbestos or other non-conducting material. The ash-pan $g$ is externally closed—that is to say, it has no openings to receive external air excepting through the passage $f$, so that all the air drawn into the ash-pan and fire-box by the exhaust has to pass through the chamber $d$ and jacket $e$, so that when it reaches the ash-pan and fire-box it is heated to a considerable extent by the heat radiated from the surfaces of the smoke-arch and boiler over which it passes. The ash-pan is internally subdivided, so that the air which enters its forward end through the passage $f$ is distributed and delivered uniformly to all parts of the grate. This result is accomplished in the embodiment of my invention here shown by means of two longitudinal partitions $i\ i$, extending from the forward end of the ash-pan partly to the rear end, and a transverse partition $i'$, extending across the space between the partitions $i\ i$ and at the rear end thereof. The partitions $i, i,$ and $i'$ form an air-receiving pocket extending from the front end of the grate partly to its rear end and not extending entirely across the ash-pan, narrow spaces or conduits $i^2\ i^2$ being formed between the sides of the ash-pan and the partitions $i\ i$. These conduits extend to a chamber $i^3$ under the rear end of the grate and conduct a part of the air that is delivered by the passage $f$ to the said chamber $i^3$. By this construction I prevent the air entering the fire-box from passing in a greater volume through the forward end of the grate than through the rear end, the conduits $i^2$ $i^2$ conducting sufficient air to the rear end of the grate to properly supply the rear portion of the fire-box. The partitions $i$ $i$ do not extend up to the under surface of the grate, but are offset, as shown at $i^4$ $i^4$, Figs. 5 and 6, so that they do not obstruct the admission of air to all portions of the under surface of the grate forward of the partition $i'$.

$j$ represents a segmental register arranged to close and open the openings $d'$, constituting the forward air-inlet, and $j'$ represents a similar register arranged to close and open the openings $d^4$, constituting the rear air-inlet. In stormy weather it is desirable to close the openings $d'$ to prevent the admission of rain and snow, and at such times the air is taken in through the rear inlet; but when the front inlet is open it is of course essential that the rear inlet be closed. I have therefore provided means for simultaneously moving the two registers $j$ $j'$ and have arranged said registers and the air-openings so that simultaneous movement of the two registers in one direction will close the front inlet and open the rear inlet, or vice versa. To this end I show a shaft $k$, journaled in bearings $k'$ $k'$, affixed to the exterior of the chamber $d$ and provided with gears $k^2$ $k^2$, meshing with segmental racks $k^3$ $k^3$, affixed to the registers. The shaft $k$ may extend to the cab of the locomotive, so that it may be operated from within the cab. Obviously when the front inlet only is open a greater amount of air enters the chamber than when the rear inlet is open.

I prefer to provide the chamber $d$ with a branch $d^6$, which incloses the smoke-stack $s$ and is provided near its upper end with air-inlets $d^7$. The said branch enables the heat radiated from the smoke-stack to be utilized in heating the air supplied to the fire-box, as will be readily seen. In addition to the advantage of providing the fire-box with heated air, thus greatly facilitating combustion and consuming smoke, I entirely prevent the escape of sparks, live coals, and cinders from the ash-pan, thus greatly reducing the liability of setting fires along the track. If desired, a portion of the air passing through the passage $f$ may be admitted to the fire-box above the usual fire-brick arch therein. For this purpose orifices $o$ $o$ (see dotted lines, Fig. 5) may be made in the front water-leg of the boiler, constituting the front wall of the fire-box.

I claim—

1. A locomotive-engine having an air-chamber exterior to the smoke-arch, and adapted to be heated thereby, said chamber being provided with means for preventing the direct passage of air therethrough, an air-conducting sheath or jacket surrounding the boiler and connected at one end with the air-chamber, and at the other end with the fire-box, whereby heated air from the said chamber is conducted in a thin stratum along the heated external surface of the boiler, and delivered, additionally heated, to the fire-box, and means for varying the admission of air to the said chamber.

2. A locomotive-engine having an air-chamber exterior to the smoke-arch, means for connecting said chamber with the fire-box, air-inlets at the front and rear ends of said chamber, and registers whereby either of said inlets may be closed.

3. A locomotive-engine having an air-chamber exterior to the smoke-arch, means for connecting said chamber with the fire-box, air-inlets at the front and rear ends of said chamber, registers adapted to close said inlets, and means for simultaneously operating the registers, the said inlets and registers being arranged so that when one register is opened the other is closed.

4. A locomotive-engine having an air-chamber surrounding the smoke-arch and provided with internal horizontal partitions to form a sinuous passage, said passage having an air-inlet at its front end, and an air-conduit surrounding the boiler and extending from the other end of said passage to the fire-box.

5. A locomotive-engine having an externally-closed ash-pan, means for heating air and conducting it to said inlet, and the longitudinal partitions $i$ $i$ extending from the forward end of the ash-pan partly to the rear end, and a transverse partition $i'$ extending across the space between the partitions $i$ $i$ at the rear end thereof, whereby the space within the ash-pan is divided into side conduits $i^2$ $i^2$ communicating with a chamber $i^3$ at the rear of the partition $i'$, for uniformly supplying air to all parts of the grate.

In testimony whereof I have affixed my signature in presence of two witnesses.

HENRY H. HUFF.

Witnesses:
  C. F. BROWN,
  A. D. HARRISON.